United States Patent
Garroussi et al.

(10) Patent No.: US 6,282,584 B1
(45) Date of Patent: Aug. 28, 2001

(54) STRUCTURE AND METHOD FOR READING/ WRITING SIGNATURE COMMANDS FROM/ TO A PLURALITY OF CONTROLLER PAIRS

(75) Inventors: Mitra Mehin Garroussi, Boulder; Al Mansur, Westminster, both of CO (US)

(73) Assignee: International Business Machines Corporation, Armonk, CA (US)

( * ) Notice: Subject to any disclaimer, the term of this patent is extended or adjusted under 35 U.S.C. 154(b) by 0 days.

(21) Appl. No.: 09/136,642

(22) Filed: Aug. 18, 1998

(51) Int. Cl.[7] .................................................... G06F 3/00
(52) U.S. Cl. ........................... 710/5; 710/15; 711/4; 711/100; 711/114; 714/5; 714/6; 714/7
(58) Field of Search ................. 714/1, 6, 47, 5, 714/9, 42, 7; 709/217; 710/37, 5, 15; 370/248; 379/32; 713/1, 100, 200; 700/79, 82; 711/100, 114, 4

(56) References Cited

U.S. PATENT DOCUMENTS

| | | | |
|---|---|---|---|
| 3,889,237 | * | 6/1975 | Alferness et al. ................ 711/148 |
| 4,468,731 | * | 8/1984 | Johnson et al. ................... 714/42 |
| 4,959,849 | * | 9/1990 | Bhusri ............................. 379/32 |
| 4,980,819 | * | 12/1990 | Cushing et al. .................. 712/30 |
| 5,313,386 | * | 5/1994 | Cook et al. ...................... 700/82 |
| 5,546,535 | * | 8/1996 | Stallmo et al. ................... 714/9 |
| 5,553,230 | * | 9/1996 | Petersen et al. .................. 714/1 |
| 5,668,800 | * | 9/1997 | Stevenson ...................... 370/248 |
| 5,768,623 | * | 6/1998 | Judd et al. ...................... 710/37 |
| 5,790,775 | * | 8/1998 | Marks et al. .................... 714/9 |
| 5,828,820 | * | 10/1998 | Onishi et al. .................... 714/6 |
| 5,928,367 | * | 7/1999 | Nelson et al. ................... 714/6 |
| 5,975,738 | * | 11/1999 | Dekoning et al. ............... 700/79 |
| 6,009,535 | * | 12/1999 | Halligan et al. ................. 714/5 |
| 6,078,968 | * | 6/2000 | Lo et al. ......................... 710/5 |
| 6,079,033 | * | 6/2000 | Jacobson et al. ................ 714/47 |
| 6,094,676 | * | 7/2000 | Gray et al. ...................... 709/217 |

* cited by examiner

*Primary Examiner*—Zarni Maung
*Assistant Examiner*—Wen-Tai Lin
(74) *Attorney, Agent, or Firm*—Flehr Hohbach Test Albritton & Herbert LLP

(57) ABSTRACT

Apparatus, system, and method for a new direct commands including a Write Signature command and a Read Signature Command for use in a computer system. The Write Signature Command and associated hardware structure allow an external configurator to write a signature to a controller. The Read Signature Command allows the signature to be read from the controller that was previously written to for verification, and with appropriate parameters selected (for example, a different ID), to read the signature from the partner of the addressed controller. The signature is retained by each partner of the controller-pair for reading by the host and by its partner. Provision of this capability advantageously provides the external configurator the means for determining the partner of a particular controller.

29 Claims, 5 Drawing Sheets

STRUCTURE AND METHOD FOR READING/
WRITING SIGNATURE COMMANDS FROM/
TO A PLURALITY OF CONTROLLER PAIRS

FIELD OF THE INVENTION

This invention relates generally to disk array controllers for computer systems, and more particularly to structure and method for configuring controllers and identifying controller relationships where the system includes a plurality of controller pairs.

BACKGROUND OF THE INVENTION

External configurators are software tools used by various vendors, OEMs, system integrators, and the like to configure, monitor, and maintain RAID controllers. In a dual active controller environment, configurators will monitor the presence and activity of the partner controllers. External configurators generally need some means of determining the partner of a particular external RAID controller in a dual-active controller configuration, for example in controllers such as the controllers in the Mylex External RAID Controller SX/SF family, or similar controllers. Previously it was not possible to reliably determine the partner SX/SF of a particular SX/SF and therefore know which SX/SF is going away because of a Reset Controllers or other duplex effecting command.

In an environment where one or more host computers (with external configurators) and RAID controllers exist, each external configurator will need to determine the relative partnership of the attached controllers. The configurator may do so by writing a signature to the controller, which can later be read back. Through their monitoring efforts, the configurators will be able to detect a change in the state of a controller, and know which controller in a controller-pair is affected. Heretofore, configurators had not had any means to readily identify partner controllers in a dual active controller pair.

SUMMARY OF THE INVENTION

The invention provides apparatus, system, and method for a new direct commands including a Write Signature command and a Read Signature Command for use in a computer system. The Write Signature Command and associated hardware structure allow an external configurator to write a signature to a controller. The Read Signature Command allows the signature to be read from the controller that was previously written to for verification, and with appropriate parameters selected (for example, a different ID), to read the signature from the partner of the addressed controller. The signature is retained by each partner of the controller-pair for reading by the host and by its partner. Provision of this capability advantageously provides the external configurator the means for determining the partner of a particular controller.

DETAILED DESCRIPTION OF EMBODIMENTS OF THE INVENTION

Figure 1:
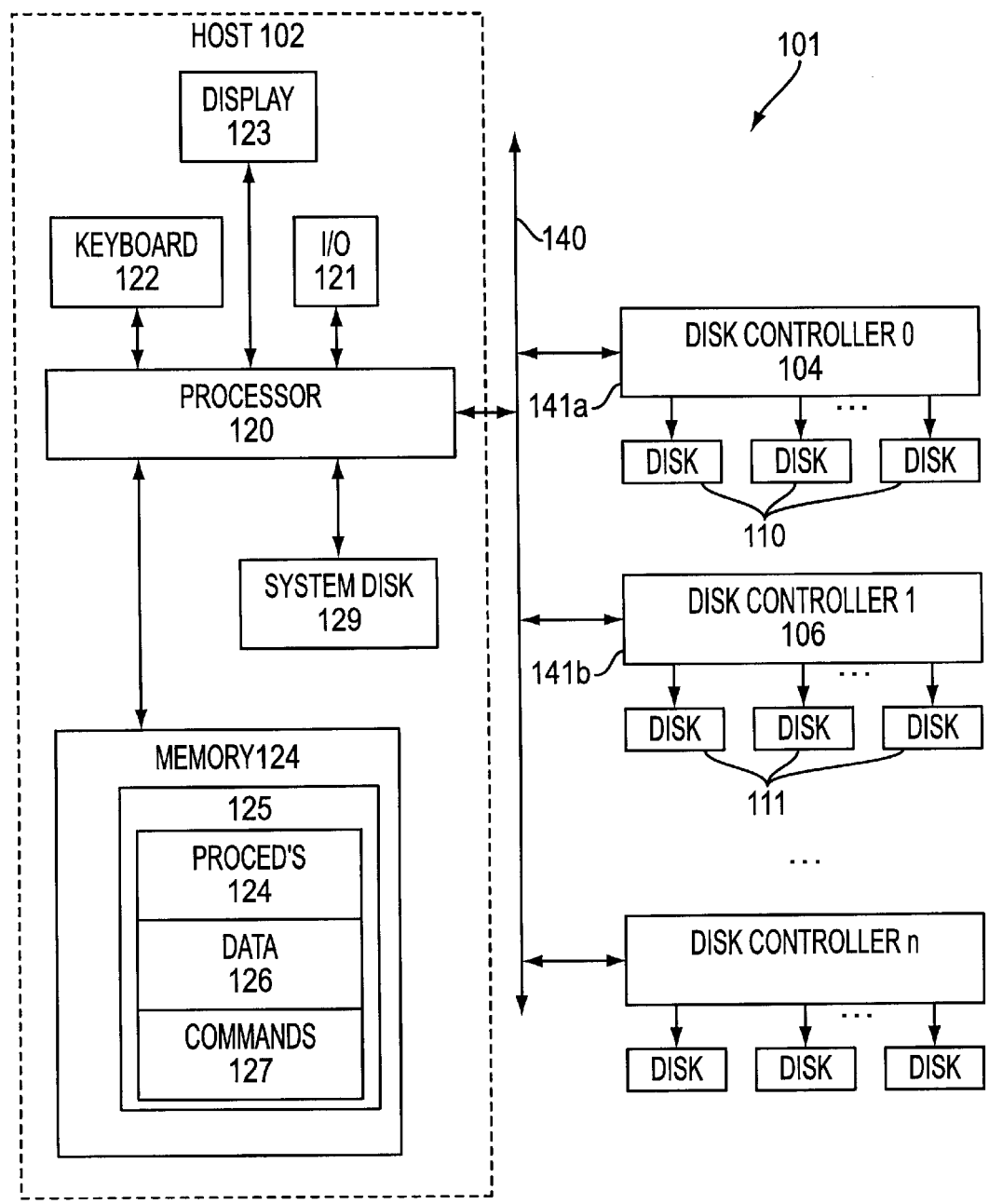
FIG. 1 is a diagrammatic illustration showing one typical host system-disk array configuration.

We now describe embodiments of the invention relative to the computer system illustrated in FIG. 1. An exemplary embodiment of the inventive computer system 101 including a host computer 102, disk array controllers 104, 106, and arrays of disk drives 110, 111, each array including one or more individual disk drives is illustrated in FIG. 1. Host computer 102 includes a processor 120, input/output devices 121, such as a keyboard 122, display device 123, memory 124 coupled to the processor and having a defined data structure 125 for storing data 126, commands 127, and procedures 128; and a system disk drive 129. Other conventional computer system components may also be provided. The controller is coupled to the processor by a SCSI (Small Computer System Interface) bus or a Fibre Channel interface 140, and the disk drives are coupled to the controller by a SCSI bus or a Fibre Channel interface 141, in conventional manner. While we primarily refer to disk drives or hard disk drives in this description, it should be understood that the invention is applicable to many types of storage media, including but not limited to rotating magnetic disk drives, magneto-optical devices, readable/writable CD's, fixed or removable media, floppy disk drives, and even electronic or solid state storage media.

The disk drive arrays 110, 111 each include a plurality of disk drives, but the controller may be configured to control only a single disk drive. One or a plurality of disk controllers may generally be provided, although in presently implemented systems and in the embodiments illustrated and described herein, only one or two disk controllers are provided in the inventive system. Each array of disk drives is disposed in an enclosure as is commonly done for Redundant Array of Independent Disk (RAID) storage configurations.

Figure 2:
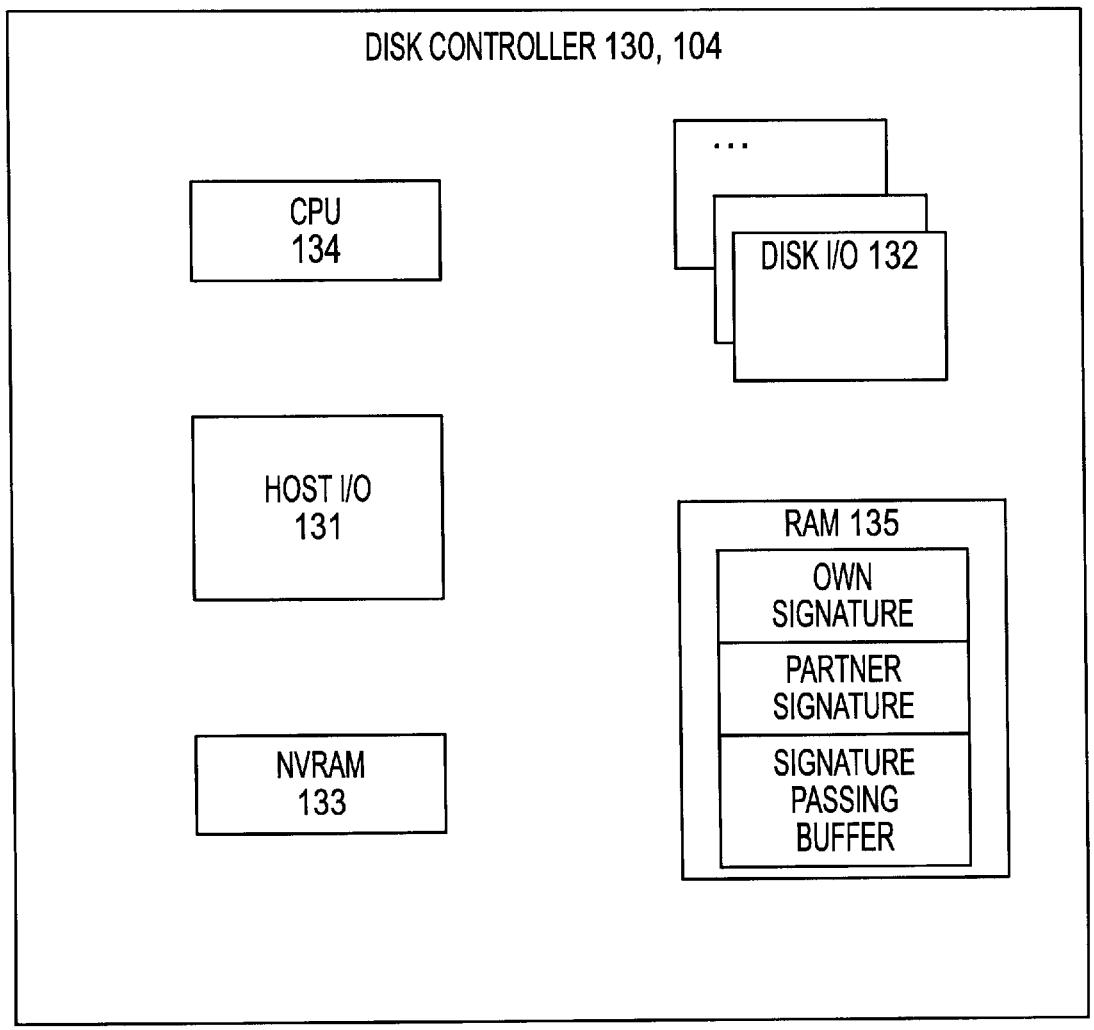
FIG. 2 is a diagrammatic illustration of a disk array controller.

In FIG. 2, there is illustrated a functional block diagram of an exemplary disk controller 130. Disk controller 130 is disposed within a separate enclosure external to the host computer 136 (See FIG. 1) and is typically fabricated as a single printed circuit board. Disk controller 130 includes host I/O interface(s) 131, disk I/O interface(s) 132, non-volatile RAM (NVRAM) 133, CPU 134, and storage means 135 such as a RAM memory.

When the signatures are written by the External Configurators, they are stored in RAM area of the controllers. The Signatures are fetched from their RAM locations when the External Configurators ask to read them. When a controller's signature is written, it informs its partner controller of its signature through the communication path between the two partner controllers, in one/this case (for example for some Mylex controllers), through one of the Disk I/O paths, which is a SCSI bus. The signature information is passed to the partner in a signature passing buffer, which is also 16 bytes long and resides in RAM. Each controller maintains information on its own signature and that of its partner. The external configurator may ask a controller to report its own signature or that of its partner.

Figure 3:
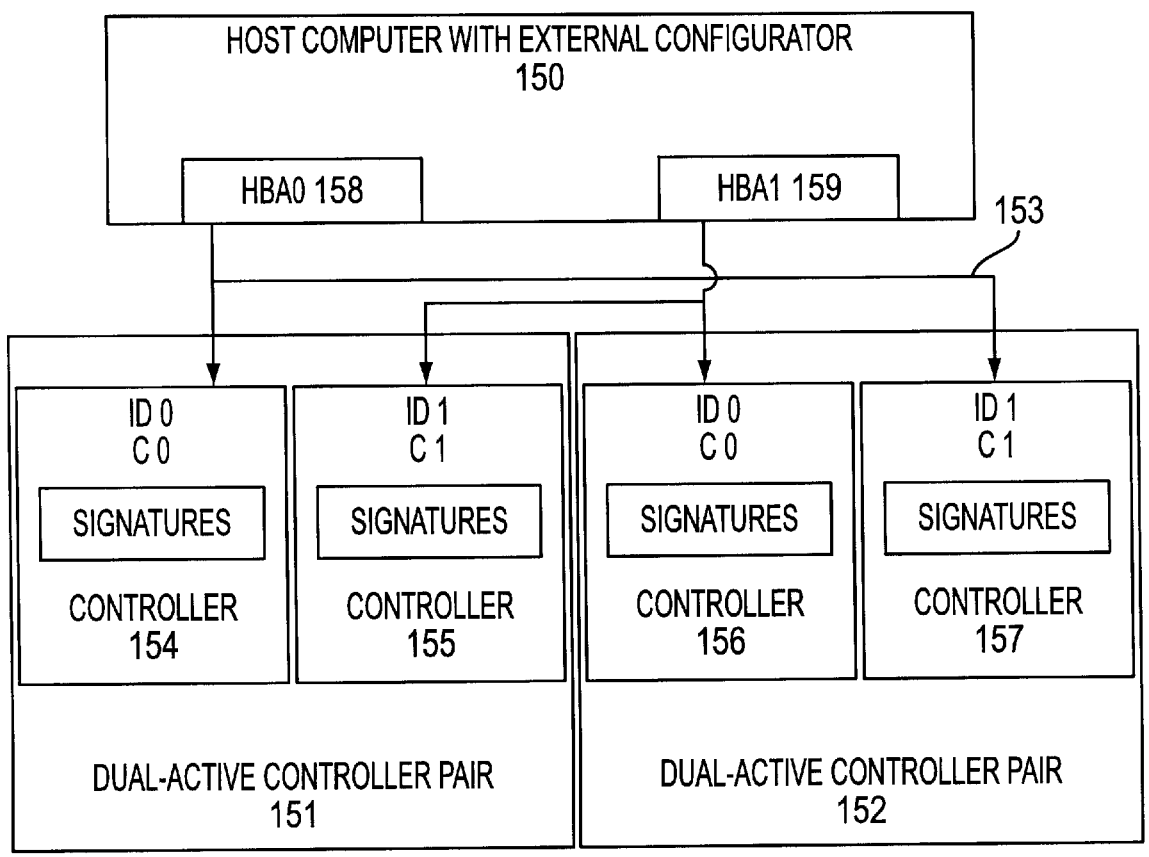
FIG. 3 is a diagrammatic illustration showing a possible environment for utilization of embodiments of the invention.

The Write/Read Signature commands are intended for use in an environment which includes one or more host computers or one or more Host Bus Adapters and one or more dual active RAID controller pairs. Any time more than one controller pair is present, it is necessary for the external configurator(s) to be able to identify the relative partnership of the controllers. FIG. 3 shows a possible configuration with one host computer 150 which houses two Host Bus Adapters 158,159, and two pairs of dual active RAID controllers 151,152. The host adapters are connected to the two separate dual active RAID controllers by interface cables 153 such as a SCSI bus or a Fibre Channel. The controller pairs 151,152 each consist of two controllers 154,155 and 156,157. In each controller pair, the first controller (controller 0) 154,156 has a controller ID of 0, whereas the second controller (controller 1) 155,157 has a controller ID of 1. By writing signatures to the controllers, the external configurator provides itself with a method of keeping track of controller partnerships. Even though two devices with an ID of 0 exist (154 and 156), the signatures written on them will differentiate between the one connected to the first Host Bus Adapter (HBA0) 158 and the one connected to the second Host Bus Adapter (HBA1) 159.

This invention is directed to a new pair of direct commands, WRITE SIGNATURE and READ SIGNATURE. The WRITE SIGNATURE command allows an external configurator to write a signature to an external RAID controller. The READ SIGNATURE command allows the signature to be read from the "written to" controller for verification and, with a parameter setting and different ID, read the signature from the partner of the addressed controller. The signature is retained by each controller for reading by the host and by its partner.

In a multiple Host Bus Adapter (HBA) setup there can be multiple RAID controllers with duplicate IDs, so that knowing the partner controller's ID is not enough to identify a specific controller. Since the signatures will be unique to each controller, they provide a more effective way of identifying a controller which might share a common ID with another controller in the system.

Some of the structural and operational features of the READ/WRITE SIGNATURE commands are highlighted immediately below:

(a) Each controller has a signature, and shares its signature with its partner controller (b) if a controller is in a failed state, its signature can't be written (c) If a controller's signature was written prior to its failing, the signature can still be read, but cannot be overwritten.

(d) The WRITE SIGNATURE command only allows one controller's signature to be written (info is passed to partner over the I/O interface between controllers.)

(e) The READ SIGNATURE command allows the user to read the controller's signature or its partner controller's signature.

(f) 16 bytes of data should be sent down for the signature, the first of which will be ignored, and overwritten with information such as valid/invalid, failed over/not failed over, and this controller/partner controller.

(g) In the first byte of the returned read information, you will always get "3x". The "3" is to make the number ASCII, because the signature will be ASCII generally. In the lower nibble, the bits have the following meaning:

Bit 3—Undefined. Will always return 0.
Bit 2—If set, signature is valid. If clear, signature hasn't been written yet.
Bit 1—If set, system is in failed over mode (will be set when reading either controller's signature, even if one is failed and one is survivor.) If clear, both controllers are active.
Bit 0—If set, we're reporting partner's signature. If clear, we're reporting this controller's signature.

We now describe the invention in greater detail. The invention is directed to structure and method for implementing two new commands in a RAID controller, namely a "WRITE SIGNATURE" command and a "READ SIGNATURE" command. The particular detailed embodiments described are vendor specific commands adapted to Mylex Corporation architectures and firmware procedures, but the structure and operation of the commands may readily be generalized to other systems and vendors. These commands and the methodology they represent are of particular interest and applicability for use by external configurators and other host applications which benefit from or need to be able to identify partner controller pairs in multiple dual-active controller environments.

By "partners" we mean two disk array controllers of the same type (for example, two Mylex RAID controllers) which operate in a dual active mode, having access to the same set of disk drives and being able to operate in a Failed-Over mode, or the equivalent. By "multiple dual-active controller" we mean an environment in which more than one pair of dual-active controllers exist, or the equivalent. By "dual active" we mean a disk array system with two active controllers handling requests from a host computer(s), or the equivalent. Both controllers are capable of taking over the host traffic operations of the other controller in the event of a failure. By "failed-over mode" we mean when one controller in a controller pair is non-functional, its Partner Controller will seamlessly assume the failed controller's identity and workload, while maintaining its own identity and workload, or the equivalent.

In one embodiment of the invention, the inventive structure and method are applied to any among the family of Mylex External Raid controllers, namely the DAC960SX and DAC960SF controllers made by Mylex Corporation of Fremont, Calif. One exemplary application for the invention is for use by Global Array Manager (GAM) (a Mylex External Configurator product) in a clustered environment, that is in an environment in which multiple host computers are present.

Conventionally, each addressable controller is written a signature (in the form of a 16-byte string of characters very similar or same as that written to the partner controller) that identifies the controllers as partners.

The signature for each controller in a dual-active setup can be written with the WRITE SIGNATURE direct command. This command allows the signature of the addressed controller to be written. The controller receiving this command will then pass its own signature to its partner controller by way of a Master-Slave interface operation. It is not possible to "write the partner's signature", only the controller's own signature.

The signature for each controller can be read with the READ SIGNATURE direct command. With this command, the user can specify whether the controller's own signature, or the controller's partner's signature is to be read. It is possible to read either the addressed controller's own signature or the addressed partner's signature.

In one embodiment of the invention, the signatures are not saved in any permanent location, and such signatures are lost upon reset/reboot; however, the signatures may optionally be stored in a permanent location. It is up to the external configurator to write the signatures once upon starting up its communication with the controllers and any time the configurator is told to look for new devices previously absent. The signatures are not stored in non-volatile memory because it is assumed that configurators will be the only application or at least the main application interested in the WRITE/READ SIGNATURE commands, and also that they will issue this command once at start time.

In the exemplary embodiment, the WRITE SIGNATURE command takes sixteen (16) bytes of data from the host. The first byte of the sixteen bytes will be ignored and used instead as a means for the READ SIGNATURE command to report status information relevant to the READ SIGNATURE command. The READ SIGNATURE command will return sixteen (16) bytes of data, the first byte of which will contain status information (i.e. information relating to the status of the controllers and the signature being reported) such as valid/invalid signature indication, failed over/dual active state, and whether the READ SIGNATURE command is reporting the signature for this controller or the partner controller. The subsequent fifteen (15) bytes will be the same as those written with the WRITE SIGNATURE command.

The READ SIGNATURE and WRITE SIGNATURE commands provide several advantages over conventional structures and methods for identifying individual controllers and their relative partnerships with each other, including:

a) Provides structure and method for identifying partner pairs which was previously unavailable in conventional systems and methods;

b) Provides structure and method for establishing controller partnerships is possible using the RAID controllers' serial numbers; however, using the READ/WRITE SIGNATURE method saves a step in the manufacturing process by eliminating the need for such serial numbers since the signatures will provide the information for identifying and maintaining controller partnership;

c) Provides structure and method for distinguishing controllers, where for the RAID controllers that do not provide serial numbers, the inventive signature is the only way to uniquely distinguish a controller from others existing in the same system, environment, setup, or the like.

Specific embodiments of WRITE SIGNATURE and READ SIGNATURE commands are now described; however those workers having ordinary skill in the art will realize that there are many ways to implement the features of the inventive structure and method, and that the invention is not limited to the particular data and/or command structure detailed hereinbelow.

We now describe in detail, an exemplary embodiment of the WRITE SIGNATURE command using the SCSI protocol. The WRITE SIGNATURE command using the SCSI protocol has the Command Descriptor Block (CDB) format illustrated in Table 1. This command involves a Data-Out phase wherein the host will send down sixteen (16) bytes of Signature data for the addressed controller. Data-Out phase is when data is sent from the host computer (SCSI Initiator) to the controller (SCSI Target), as the SCSI protocol specifies. Byte 0 is filled with status information, and is ignored for purposes of being overwritten with other information by the READ SIGNATURE command (see READ SIGNATURE command description). In a preferred embodiment, the signature written will be in ASCII format, other formats may be used, and even when ASCII format is adopted, no checks will be done to ensure this. The checks are not performed so that the external configurators may have the flexibility and/or freedom to write whatever signature is useful to them.

Upon receipt of this WRITE SIGNATURE command and the corresponding Data-Out phase information from the external configurator, the addressed controller will write the specified signature into its "own signature" location. It will then pass the information to its partner controller (if active). If the partner controller is inactive, such as in a failed state, the partner controller will not receive the newly written signature. In such a case, since the active controller is responding to all host requests on behalf of its failed partner controller, the signatures may still be read back using the READ SIGNATURE command. The signature just written may be read back because the active controller has knowledge of it and will report it to the host whether the READ SIGNATURE command was targeted at it or at its failed partner.

Figure 4:
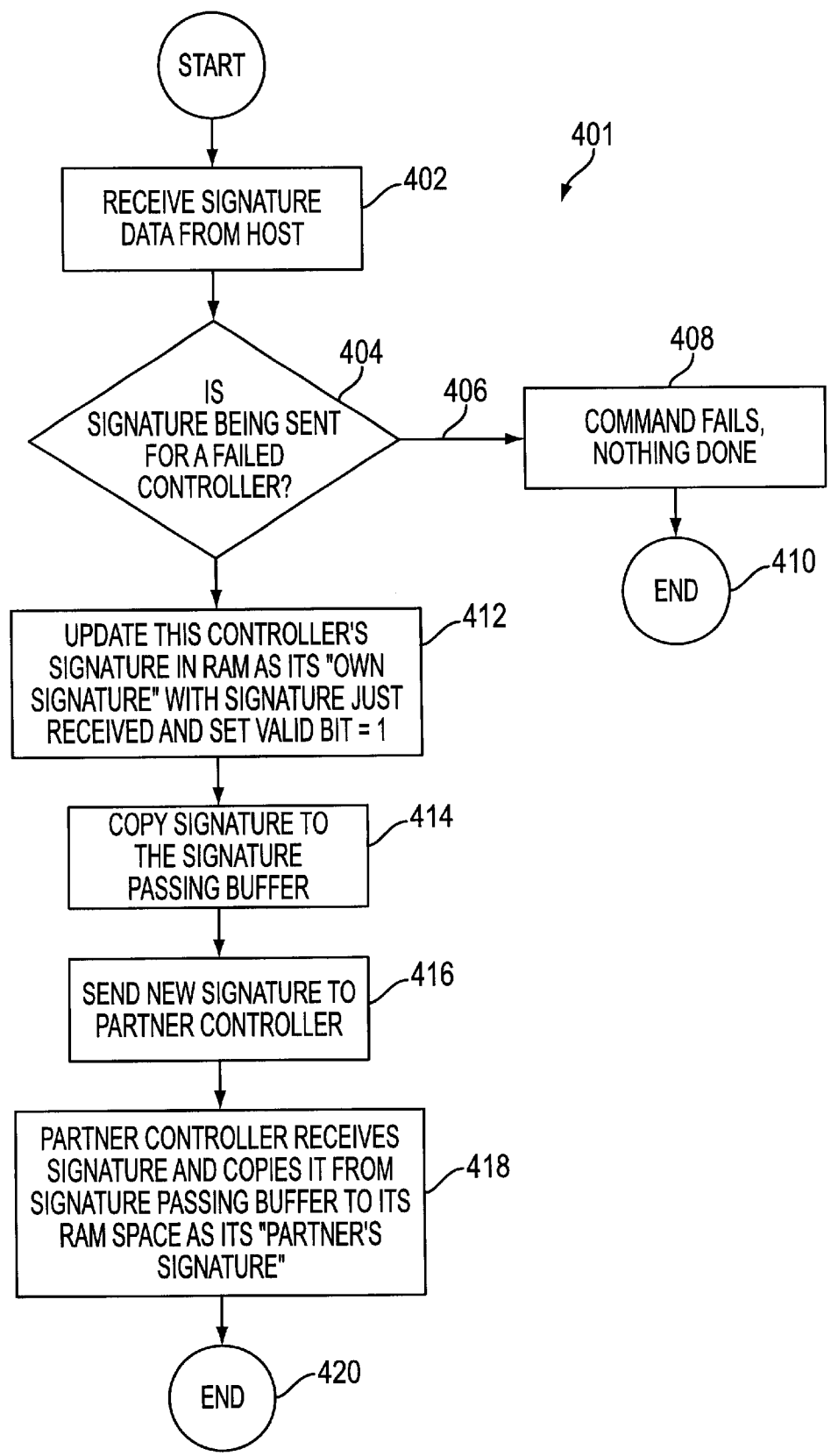
FIG. 4 is a diagrammatic illustration showing a write signature command flowchart.

One embodiment of the inventive WRITE SIGNATURE procedure is diagrammatically illustrated in FIG. 4. The procedure begins by receiving signature data from the host (Step 402). Then a determination is made as to if the signature is being sent for a failed controller (Step 404). If the signature is being sent for a failed controller (Step 406), then the WRITE SIGNATURE command fails and nothing is done (Step 408), and the procedure ends (Step 410). However, if the signature is not being sent for a failed controller, the controller's signature is updated in RAM as its "own signature" with the signature just received and the valid bit is set to 1 (Step 412). Then the signature is copied to the signature passing buffer (Step 414), and the new signature is sent to the partner controller (Step 416). Finally, the partner controller receives the signature and copies it from signature passing buffer to its RAM space as its "partner's signature" (Step 418), and the procedure ends (Step 420).

We now describe in detail, an exemplary embodiment of the READ SIGNATURE vendor unique command using the SCSI protocol. This embodiment of the READ SIGNATURE direct command has the CDB format illustrated in Table 2. The controller field (Byte 3) can have the following values:

00h—Report this controller's signature.

01h—Report the partner controller's signature.

02h—ffh: invalid settings

This command involves a Data-In phase wherein the controller will send 16 bytes of Signature data to the host. The Data-In phase is when data is sent from the controller (SCSI Target) to the host computer (SCSI Initiator), as the SCSI protocol specifies. This Read Signature Data will have the format illustrated in Table 3. The Byte 0 fields of the Read Signature Data are defined as illustrated in Table 4.

The first time a signature is written, the "Valid" bit (Table 4, bit 2) changes from "0" to "1" and remains so until the following reset/reboot. The "Failed" bit (Table 4, bit 1) is set when either controller is in a failed state. In this failed over situation, the signatures of both controllers (failed and active) are reported with the "Failed" bit set. The "Which" bit (Table 4, bit 0) identifies which controller's signature is being reported. When the "Controller" field (Table 2, Byte 3) in the CDB is set to 00h (report this controller's signature), the "Which" bit (Table 4, bit 0) returned will be "0". When the Controller field in the CDB is set to 01h (report the partner controller's signature), the "Which" bit returned will be "1".

In the case where a controller's signature is read before it has been written, the returned data will show a Valid bit of 0, a "Which" bit of 0, and bytes 1–15 will contain 00's. The Failed bit will reflect the true condition of the controllers, i.e. "0" if both controllers are active, "1" if either of the controllers is in a failed state.

Figure 5:
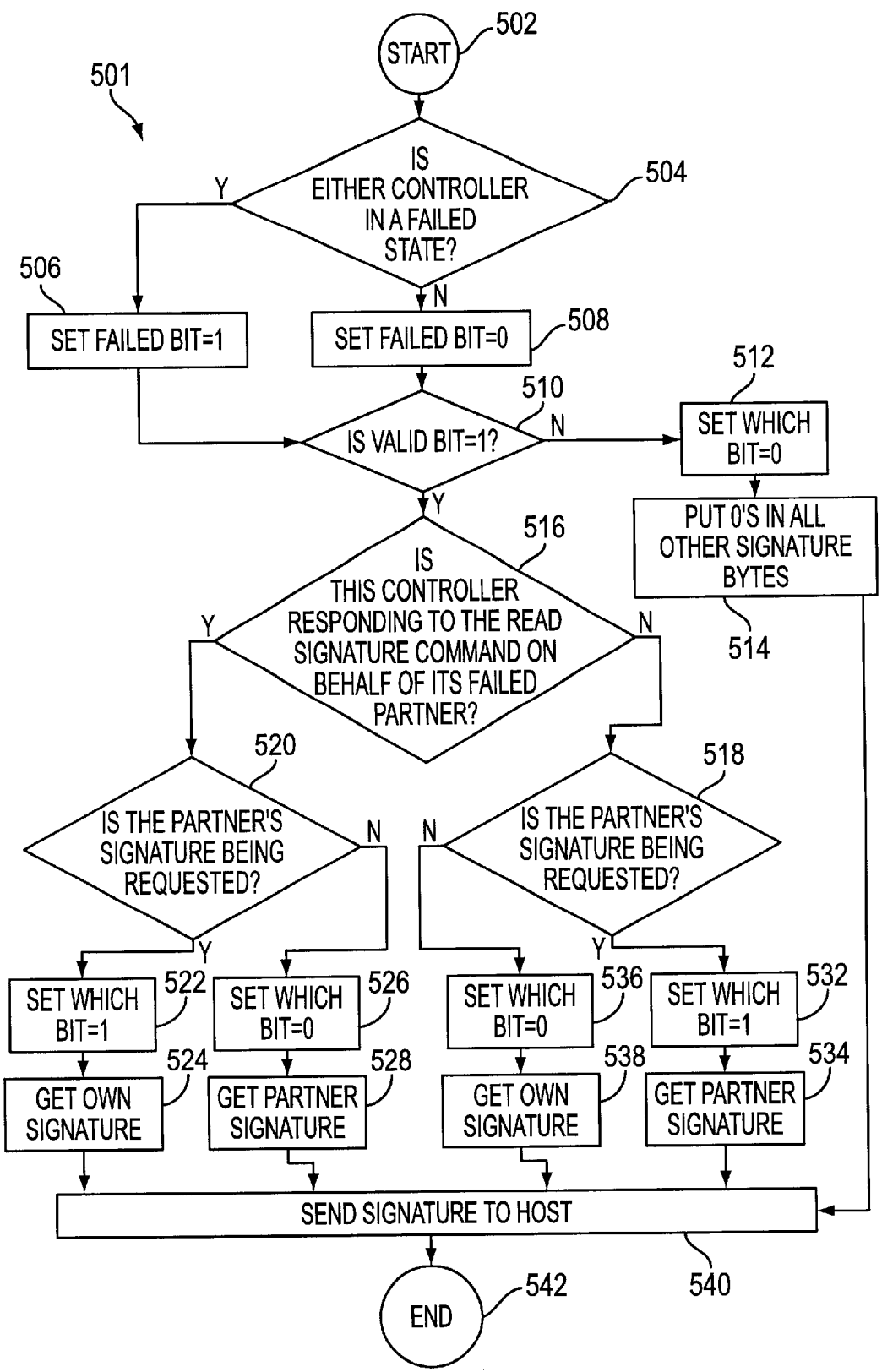
FIG. 5 is a diagrammatic illustration showing a read signature command flowchart.

One embodiment of the inventive READ SIGNATURE procedure is diagrammatically illustrated in FIG. 5. The procedure begins (Step 502) by determining if either of the two controllers in the controller pair is in a failed state (Step 504). If either controller is in a failed state, the "Failed" bit is set to "1" (Step 506), otherwise the "Failed" bit is set to "0" (Step 508), and in either case the procedure then determines whether the "Valid" bit is "1" (Step 510). If it is not set to "1", then the "Which" bit is cleared to "0" (Step 512), and zeros ("0") are put in the remaining 15 bytes (Step 514), before the signature is sent to the host (Step 540). (Note that although certain bit patterns or numbers of bits are described relative to the exemplary embodiment, the inventive structure and method are not limited to these particular bit configurations.) On the other hand, if the valid bit is set to "1", a determination is made if this controller is responding to the READ SIGNATURE command on behalf of its failed partner (Step 516). Depending on the result of this query, the Which bit is set or cleared, and either the own signature, or the partner signature is retrieved and sent to the host, as described now in greater detail.

If the controller is responding to the READ SIGNATURE command on behalf of its failed partner, then a second test is performed (Step 520) to determine if it is the partner's signature that is being requested. If it is the partner's signature that is being requested, the "Which" bit is set to 1 (Step 522), it's "own signature" is retrieved (Step 524) and that signature is sent to the host (Step 540), at which point the procedure ends (Step 542). But, if it is not the partner's signature that is being requested, the "Which" bit cleared to 0 (Step 526), the "partner's signature" is retrieved (Step 528) and that signature is sent to the host (Step 540), at which point the procedure ends (Step 542).

A different path is followed in the event that the controller is not responding to the READ SIGNATURE command on behalf of its failed partner, then an additional test is performed (Step 518) to determine if it is the partner's signature that is being requested. If it is the partner's signature that is being requested, the "Which" bit is set to 1 (Step 532), the "partner's signature" is retrieved (Step 534) and that signature is sent to the host (Step 540), at which point the procedure ends (Step 542). But, if it is not the partner's signature that is being requested, the "Which" bit cleared to 0 (Step 536), it's "own signature" is retrieved (Step 538) and that signature is sent to the host (Step 540), at which point the procedure ends (Step 542).

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

TABLE 1

Write Signature Command CDB

| Bit/Byte | 7 | 6 | 5 | 4 | 3 | 2 | 1 | 0 |
|---|---|---|---|---|---|---|---|---|
| 0 | Operation Code (20h) | | | | | | | |
| 1 | LUN | | | Reserved | | | | |
| 2 | OP CODE - WRITE SIGNATURE (4Dh) | | | | | | | |
| 3 | Reserved | | | | | | | |
| 4 | Reserved | | | | | | | |
| 5 | Reserved | | | | | | | |
| 6 | Reserved | | | | | | | |
| 7 | Allocation Length MSB = 0x00 | | | | | | | |
| 8 | Allocation Length LSB = 0x10 | | | | | | | |
| 9 | Control Byte | | | | | | | |

TABLE 2

Read Signature Command CDB

| Bit/Byte | 7 | 6 | 5 | 4 | 3 | 2 | 1 | 0 |
|---|---|---|---|---|---|---|---|---|
| 0 | Operation Code (20h) | | | | | | | |
| 1 | LUN | | | Reserved | | | | |
| 2 | OP CODE - WRITE SIGNATURE (4Eh) | | | | | | | |
| 3 | Controller | | | | | | | |
| 4 | Reserved | | | | | | | |
| 5 | Reserved | | | | | | | |
| 6 | Reserved | | | | | | | |
| 7 | Allocation Length MSB = 0x00 | | | | | | | |
| 8 | Allocation Length LSB = 0x10 | | | | | | | |
| 9 | Control Byte | | | | | | | |

TABLE 3

Format of Read Signature Data

| Bit/Byte | 7 | 6 | 5 | 4 | 3 | 2 | 1 | 0 |
|---|---|---|---|---|---|---|---|---|
| 0 | 0011b | | | | 0 | Valid | Failed | Which |
| 1–15 | Signature bytes | | | | | | | |

TABLE 4

Format of Read Signature Data Byte 0

| Bit(s) | Name | Meanings |
|---|---|---|
| 7–4 | None | Set to 3 to convert bits 3–0 to ASCII value. |
| 3 | None | Reserved. |
| 2 | Valid | 1: Valid signature has been written.<br>0: Signature has not yet been written. |
| 1 | Failed | 1: System is in failed over state.<br>0: Both controllers are active. |
| 0 | Which | 1: Read Partner's signature.<br>0: Read this controller's signature. |

We claim:

1. In a system having a host processor and first device controller and a second device controller, said first device controller and said second device controller operable as a partner controller to each other, a method for writing signature data to said first and second controllers, said method comprising:

receiving signature data by one of said first and second controllers from said host processor;

determining by said receiving controller if said received signature data has been sent as its own signature data or for a different controller that has failed;

if said received signature data has not been sent for said different controller that has failed, then:

updating the signature data stored in a memory of the receiving first controller as its own signature data with said received signature data;

copying said received signature data to a signature passing buffer in said receiving first controller;

communicating said received signature data from said signature passing buffer in said receiving first controller to a signature passing buffer in said second controller; and receiving said communicated signature data by said second controller and copying said communicated signature data from said second controller signature passing buffer to a partner signature memory storage register.

2. The method in claim 1, further comprising the step of setting a valid bit to a first logic state when said signature is not being sent for said failed controller, said first logic state being selected from the set of logic states consisting of "0" and "1".

3. The method in claim 1, wherein said memory is non-volatile random access memory.

4. The method in claim 1, wherein if said signature data is determined to have been sent for a failed controller, then taking no further action.

5. In a system having a host and a controller pair including a first controller and a second controller, each said controller in said controller pair operable as a partner controller to the other controller thereof, each controller storing a signature identifying itself and a signature identifying its partner controller, a method for reading signature data from at least one of said controllers in said controller pair even when a partner controller is in a failed state, said signature data comprising a failed bit, a valid bit, a which controller bit, and a predetermined signature uniquely identifying at least one of said controllers, said method comprising:

determining if either of the first and second controllers in said controller pair is in a failed state;

if either of said controllers is in a failed state, setting a failed bit in said signature data to indicate the failed state, and otherwise clearing said failed bit;

determining whether a valid bit within said signature data is set or cleared;

if said valid bit is not set, then clearing a which controller bit within said signature data identifying the controller to which said signature data pertains;

adding the predetermined signature to form said signature data;

communicating said signature data with said valid bit not set to said host; and if said valid bit flag is set, then determining if the controller communicating said signature data to said host is responding to a read signature command on behalf of a failed partner controller;

if the communicating controller is responding to the read signature command on behalf of a failed partner controller, then determining if it is the partner's signature data that is being requested;

if it is the partner's signature data that is being requested, then setting said which controller bit to 1, and retrieving the predetermined signature of the communicating controller to form the signature data, and communicating the signature data to the host, but, if it is not the partner's signature that is being requested, clearing said which controller bit to 0, retrieving said partner controllers predetermined signature to form the signature data, and sending the signature data to said host.

6. The method in claim 5, further comprising the steps of:
in the event that the controller is not responding to the read signature command on behalf of its failed partner, then determining if it is the partner's signature data that is being requested, and if it is the partner's signature data that is being requested, setting said which controller bit, retrieving said partner signature data, and communicating said retrieved partner signature data to said host; but, if it is not the partner's signature data that is being requested, clearing said which controller bit, retrieving its own signature data, and sending said retrieved signature data to the host.

7. In a system having a host processor coupled to a plurality of controllers, said plurality of controllers including at least an addressed controller and a partner controller in communication with said addressed controller, a method of writing a controller signature identifying controller characteristics to said addressed controller and said partner controller, said method comprising steps of:

sending controller signature data to an addressed controller wherein said controller signature data comprises a failed bit, a valid bit, a which controller bit, and a predetermined signature uniquely identifying at least one of said addressed controller and said partner controller, said addressed controller allocating a first memory location for storing addressed controller signature data and a second memory location for storing partner controller signature data, said partner controller allocating a third signature memory location on said partner controller;

if said addressed controller is not failed then receiving said signature data from the host by the addressed controller;

determining whether said received signature data comprises addressed controller signature data or partner controller signature data;

storing said addressed controller signature data into said first data memory location;

communicating said signature data to said partner controller; and storing said communicated signature data in said third memory location on said partner controller.

8. The method in claim 7, wherein said step of storing said received signature data in said first memory location further comprising setting said valid bit within said stored signature data to indicate that the stored signature data is valid.

9. The method in claim 7, wherein said addressed controller signature data is communicated to said partner controller by said addressed controller.

10. The method in claim 9, wherein said step of communicating said addressed controller signature data to said partner controller further comprises (i) copying said addressed controller signature data from said first memory location to a first signature passing buffer within said addressed controller; (ii) communicating said addressed controller signature data from said first signature passing buffer to a second signature passing buffer, said second signature passing buffer located within said partner controller; and (iii) writing said communicated addressed controller signature data from said second signature passing buffer to said third signature data memory location.

11. The method in claim 7, wherein if said addressed controller is has failed then taking no further action to receive, store, of communicate said controller signature data.

12. The method in claim 7, wherein said first, second, and third memory locations comprise memory locations in a random access memory.

13. The method in claim 7, wherein:
said step of storing said received signature data in said first memory location further comprising setting a valid bit within said stored addressed controller signature data to indicate that the stored addressed controller signature data is valid;

said addressed controller signature data is communicated to said partner controller by said addressed controller, including (i) copying said addressed controller signature data from said first memory location to a first signature passing buffer within said addressed controller; (ii) communicating said addressed controller signature data from said first signature data passing buffer to a second signature data passing buffer, said second signature passing buffer located within said partner controller; and (iii) writing said communicated addressed controller signature data from said second controller signature passing buffer to said third memory location; and said first, second and third allocated memory locations comprise memory locations in a random access memory.

14. In a system having a host processor coupled to a plurality of controllers, said plurality of controllers including at least an addressed controller and a partner controller in communication with said addressed controller, a method of reading a controller signature identifying controller characteristics of said addressed controller and said partner controller, said method comprising steps of:

issuing a read signature command by a host to read controller signature data stored in a memory of said addressed controller, said controller signature data comprising a failed bit, a valid bit, a which bit, and a predetermined signature uniquely identifying at least one of said addressed controller and said partner controller;

receiving said read signature command by the addressed controller or by a partner controller to said addressed controller;

determining if either of the addressed controller or the partner controller of the addressed controller is in a failed state;

determining whether said read controller signature data is valid or invalid;

if said controller signature data is determined to be invalid, then clearing said which bit in said signature data, and sending said read controller signature data to said host; and if said read controller signature data is determined to be valid, then sending either addressed controller signature data stored in said addressed controller, partner controller signature data stored in said addressed controller, said addressed controller signature data stored in said partner controller, or said partner controller signature data stored in said partner controller.

15. In a system having a host processor coupled to a plurality of controllers, said plurality of controllers including at least an addressed controller and a partner controller in communication with said addressed controller, a method of reading a controller signature identifying controller characteristics of said addressed controller and said partner controller, said method comprising steps of:

issuing a read signature command by a host to read controller signature data stored in a memory of an addressed controller, said controller signature data comprising a failed bit, a valid bit, a which bit, and a predetermined signature uniquely identifying at least one of said addressed controller and said partner controller;

receiving said read signature command by the addressed controller or by a partner controller to said addressed controller;

determining if either of the addressed controller or the partner controller of the addressed controller is in a failed state;

determining whether said read controller signature data is valid or invalid;

if said controller signature data is determined to be invalid, then clearing said which bit in said signature data, and sending said read controller signature data to said host; and if said read controller signature data is determined to be valid, then sending either addressed controller signature data stored in said addressed controller, partner controller signature data stored in said addressed controller, addressed controller signature data stored in said partner controller, or said partner controller signature data stored in said partner controller, if said read controller signature data is determined to be valid, then said controller signature data that is sent to said host is further determined by determining if the controller from which this controller signature data is being read is responding to the read signature command on behalf of itself or on behalf of its failed partner controller;

if said controller is responding to the read signature command on behalf of its failed partner controller, then determining if it is the partner's signature data that is being requested; and if it is the partner's signature that is being requested, setting the which controller bit, retrieving the addressed controller signature data from the addressed controllers signature data memory location, and sending said retrieved addressed controller's signature data to the host; else if it is not the partner's signature data that is being requested then clearing the which controller bit, retrieving said partner controller signature data from the partners signature data memory location, and sending said retrieved partner signature data to said host; said addressed controller's signature data and said partner signature data correspondence being reversed when said controller is responding on behalf of its failed partner controller; and if said controller is responding on behalf of itself, then determining if it is the partner's signature data that is being requested; and if it is the partner's signature data that is being requested, setting the which controller bit, retrieving the partner's signature data from the partner signature data memory location of the controller, and sending said retrieved partner signature data to said host; but, if it is not the partner's signature data that is being requested, clearing the which controller bit, retrieving the addressed controller's signature data from said addressed controller's signature data memory location, and sending said retrieved addressed controller signature data to said host.

16. The method in claim 15, wherein said determination whether either of said addressed controller or said partner controller is in an active state or a failed state.

17. The method in claim 16, wherein said determination including querying a state of a failed bit in said addressed controller or in said partner controller.

18. The method in claim 17, wherein a failed bit state is set to "1" if said controller has failed and is cleared to "0" if said controller is not failed.

19. The method in claim 15, wherein said determination as to whether said controller signature data is valid or invalid including querying a state of a valid bit in said read controller signature.

20. The method in claim 19, wherein said valid bit is set to "1" to indicate that said read controller signature data is valid and said valid bit is cleared to indicate that said read controller signature data is invalid.

21. The method in claim 15, wherein said method further comprising clearing said which bit and all additional bits of said read controller signature data when said read controller signature data is determined to be invalid before communicating said read controller signature data to said host.

22. In a system having a host processor coupled to a plurality of controllers, a method of writing controller signature data identifying controller characteristics to an addressed one of said plurality of controllers and to a partner controller of said addressed controller, and of reading controller signature data identifying controller characteristics of an addressed one of said plurality of controllers and of a partner controller of said addressed controller, said method comprising steps of:

sending signature data to an addressed controller, said addressed controller allocating a memory location for storing an own controller signature, said own controller signature referencing said addressed controller, and a partner controller signature;

if said addressed controller is not failed then receiving said signature data from the host by the addressed controller;

storing said received signature into its own controller signature memory location;

communicating said own signature to said partner controller;

storing said communicated own signature data in said partner signature memory location of said partner controller;

issuing a read signature command by a host to read a controller signature stored in a memory of an addressed controller;

receiving said read signature command by the addressed controller or by a partner controller to said addressed controller;

determining if either the addressed controller or the partner controller of the addressed controller is in a failed state;

determining whether said read controller signature is valid or invalid;

if said controller signature data is determined to be invalid, then clearing a which controller bit in said signature data, and sending said read controller signature data to said host; and if said read controller signature data is determined to be valid, then sending either said own controller signature data stored in said addressed controller, said partner controller signature data stored in said addressed controller, said own controller signature data stored in said partner controller, or said partner controller signature data stored in said partner controller.

23. A data storage system controller system for interacting with a host processor and at least one data storage device, said system comprising:

a first dual-active controller including a first processor and a first memory coupled to said processor, said first memory including a memory location allocated for storing a first own controller signature data and a memory location allocated for storing a first partner controller signature data and a first signature passing buffer;

a second dual-active controller including a second processor and a second memory coupled to said processor, said second memory including a memory location allocated for storing a second own controller signature and a memory location allocated for storing a second partner controller signature and a second signature passing buffer;

each said first and second controller storing and maintaining information on its own controller signature and on its partner controller signature in said memory locations;

a communication channel coupled between said first controller and said second controller for communicating controller signature data between said respective signature passing buffers; and each said controller being adapted to respond to a request to write controller signature data to its own controller signature and to respond to a request to read its own controller signature and to a request to read the controller signature of its partner controller.

24. The system in claim 23, wherein said communication channel comprising a disk I/O channel.

25. The system in claim 24, wherein said disk I/O channel comprising a SCSI bus.

26. The system in claim 23, wherein said at least one data storage device comprises a RAID disk drive storage array.

27. A computer program product for use in conjunction with a processor and memory coupled to said processor, the computer program product comprising a computer readable storage medium and a computer program mechanism embedded therein, the computer program mechanism executable in said processor and memory, comprising:

a program module that directs a device controller, to function in a specified manner, to cause a controller signature to be written to memory and/or read from memory within said controller, the program module including instructions for:

sending signature data to an addressed controller, said addressed controller allocating a memory location for storing its own controller signature data and the signature data of a partner controller;

if said addressed controller is not failed then receiving said signature data from the host by the addressed controller;

storing said received signature data into its own controller signature memory location;

communicating said own signature data to said partner controller; and storing said communicated own signature data in a partner signature memory location of said partner controller.

28. The computer program product of claim 27, wherein said program module further including instructions for:

receiving said read signature command from a host by the addressed controller or by the partner controller to said addressed controller;

determining if either the addressed controller or the partner controller of the addressed controller is in a failed state;

determining whether said read controller signature is valid or invalid;

if said controller signature is determined to be invalid, then clearing a which controller bit in said signature, and sending said read controller signature to said host;

if said read controller signature is determined to be valid, then sending either said own controller signature data stored in said addressed controller, said partner controller signature data stored in said addressed controller, said own controller signature data stored in said partner controller, or said partner controller signature data stored in said partner controller.

29. The computer program product of claim 27, wherein said program module comprises a portion of a RAID storage system controller configurator utility program.

* * * * *